(12) United States Patent
Chen et al.

(10) Patent No.: US 7,532,413 B2
(45) Date of Patent: May 12, 2009

(54) LENS BARREL

(75) Inventors: Chia-Hung Chen, Taipei Hsien (TW); Chin-Ching Wang, Taipei Hsien (TW)

(73) Assignees: Premier Image Technology(China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,433

(22) Filed: Dec. 18, 2007

(65) Prior Publication Data

US 2009/0052054 A1 Feb. 26, 2009

(30) Foreign Application Priority Data

Aug. 24, 2007 (CN) .................. 2007 1 0201451

(51) Int. Cl.
*G02B 15/14* (2006.01)
*G02B 7/02* (2006.01)
(52) U.S. Cl. .................. 359/700; 359/826; 359/827
(58) Field of Classification Search ............. 359/700, 359/826, 827
See application file for complete search history.

(56) References Cited

U.S. PATENT DOCUMENTS

2001/0015858 A1 * 8/2001 Hirai .......................... 359/700

* cited by examiner

*Primary Examiner*—Ricky L Mack
*Assistant Examiner*—James C Jones

(57) ABSTRACT

A lens barrel includes a lens group having an optical axis associated therewith, a fixed barrel and a rotatable barrel receives the fixed barrel. The fixed barrel has the lens group received therein and has a plurality of projections extending radially from the outer surface of the fixed barrel. The rotatable barrel rotatable relative to the fixed barrel about the optical axis has an inner latching groove and a number of insertion cutouts. The latching groove is defined in the inner surface of the rotatable barrel. The insertion cutouts are defined in a distal edge of the rotatable barrel with the inner latching groove and communicating with the latching groove. The insertion cutouts is insertable in the insertion cutouts and can engage in the latching groove for preventing the rotatable barrel to move axially relative to the fixed barrel.

16 Claims, 3 Drawing Sheets

LENS BARREL

TECHNICAL FIELD

The present invention relates to a lens barrel, and, particularly, to a mechanism of a zoom lens barrel for driving at least one lens group along an optical axis thereof.

DESCRIPTION OF RELATED ART

With the ongoing development of optical imaging technology, image capturing devices are widely used in electronic devices such as digital cameras and mobile phones. At present, most image capturing devices have a zoom lens system.

Referring to FIG. 3, a typical zoom lens barrel 100 includes a fixed barrel 6 and a rotatable barrel 5 fitted on the fixed barrel 6. The fixed barrel 6 receives lens groups (not shown) therein and has a number of linear guide slots 61 running through the surface thereof. The rotatable barrel 5 has a number of cam grooves 53 and a number of motion preventing grooves 51 running through the surface thereof. Each cam follower 54 engaged with a cam groove 53 is secured to a lens group received in the fixed barrel 6 through a linear guide slot 61. Each bolt 52 engaged with a motion preventing groove 51 is secured to the fixed barrel 6. The lens groups received in the fixed barrel 6 can only moved along a direction of an optical axis without rotating about the optical axis and the rotatable barrel 5 is immovable in the direction of the optical axis and is rotatable about the optical axis of the zoom lens barrel 100.

In order to limit the movement of the rotatable barrel 5 along the direction of the optical axis, the zoom lens barrel 100 uses a number of bolts 52 increasing the difficulty in assembling the zoom lens barrel 100, therefore, needing more time for assembling the zoom lens barrel 100.

What is needed, therefore, is a lens barrel that can overcome the above-described shortcoming.

SUMMARY

In accordance with one present embodiment, a lens barrel includes a lens group having an optical axis associated therewith, a fixed barrel and a rotatable barrel receives the fixed barrel. The fixed barrel has the lens group received therein and has a plurality of projections extending radially from the outer surface of the fixed barrel. The rotatable barrel rotatable relative to the fixed barrel about the optical axis has an inner latching groove and a number of insertion cutouts. The latching groove is defined in the inner surface of the rotatable barrel. The insertion cutouts are defined in a distal edge of the rotatable barrel with the inner latching groove and communicating with the latching groove. The insertion cutouts is insertable in the insertion cutouts and can engage in the latching groove for preventing the rotatable barrel to move axially relative to the fixed barrel.

Other novel features and advantages will become more apparent from the following detailed description when taken in conjunction with the accompanying drawings.

BRIEF DESCRIPTION OF THE DRAWINGS

Many aspects of the present lens barrel can be better understood with reference to the following drawings. The components in the drawing are not necessarily drawn to scale, the emphasis instead being placed upon clearly illustrating the principles of the present lens barrel.

DETAILED DESCRIPTION OF THE EMBODIMENTS

Embodiments of the present invention will now be described in detail below, with reference to the drawings.

Figure 1:
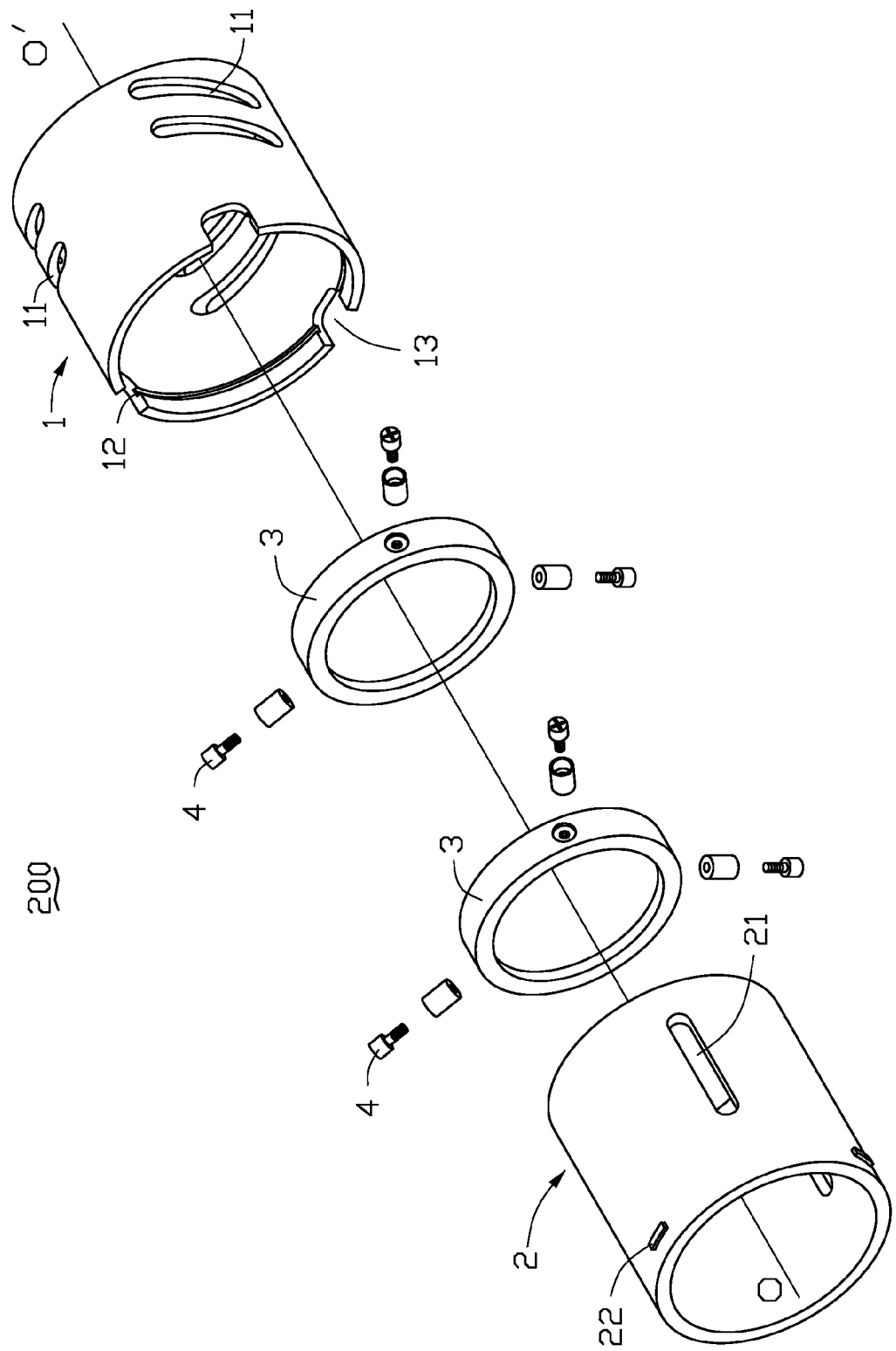
FIG. 1 is an exploded view of a lens barrel according to a present embodiment.

FIG. 1 shows in an exploded view of a lens barrel 200 according to an embodiment of the invention. The lens barrel 200 is adapted for many kinds of image capturing devices, such as projectors, digital cameras, silver-halide cameras, video cameras, etc. However, in the following description, the lens barrel is assumed to be for use in a projector (not shown). The lens barrel 200 includes a rotatable barrel 1, a fixed barrel 2, lens groups 3, and a number of cam followers 4.

The fixed barrel 2 is arranged to be secured to the projector. A number of lens groups 3 are received in the fixed barrel 2. In the present embodiment, the fixed barrel 2 receives two lens groups 3 therein. The fixed barrel 2 includes a number of linear guide slots 21 defined in the sidewall of the fixed barrel 2. The linear guide slots 21 are oriented in a radial direction of the fixed barrel 2 and extend parallel to the optical axis OO'. In the present embodiment, the fixed barrel 2 has three linear guide slots 21 (only one is shown in FIG. 1) formed in the fixed barrel 2 at 120° intervals. The fixed barrel 2 also includes three arcuate projections 22 extending radially from the outer surface of the fixed barrel 2 at 120° intervals. Preferably, the three arcuate projections 22 are integrally formed with the fixed barrel 2. The three arcuate projections 22 can be formed on the fixed barrel 2 by injection molding or press-molding and so on.

The rotatable barrel 1 receives the fixed barrel 2. In the present embodiment, the rotatable barrel 1 includes two groups of cam grooves 11, a latching groove 12, and three insertion cutouts 13 defined in a distal edge of the rotatable barrel 1 communicating with the latching groove 12. Each group of cam grooves 11 has three cam grooves 53 defined in the rotatable barrel 2 at 120° intervals. The latching groove 12 is defined in the inner surface of one end of the rotatable barrel 1. The latching groove 12 is configured for receiving the arcuate projections 22 of the fixed barrel 2 therein via the insertion cutouts 13.

In the present embodiment, the lens barrel 200 has two groups of cam followers 4 for engaging with the cam grooves 11. Every cam follower 4 engaging with a cam groove 11 is configured for securing to a lens group 3 through a linear guide slot 21.

Figure 2:
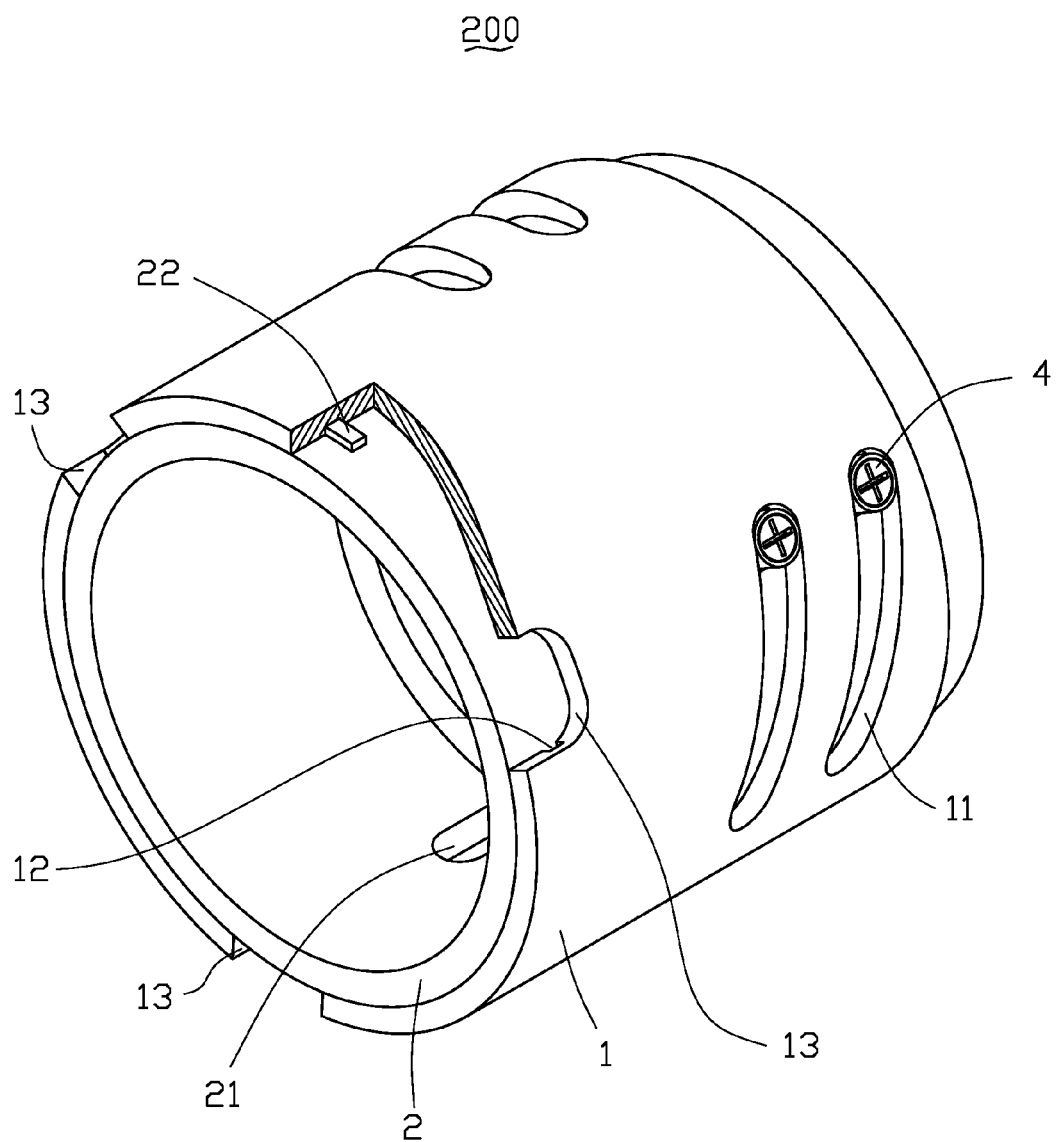
FIG. 2 is schematic assembled view of the lens barrel of FIG. 1.
Figure 3:
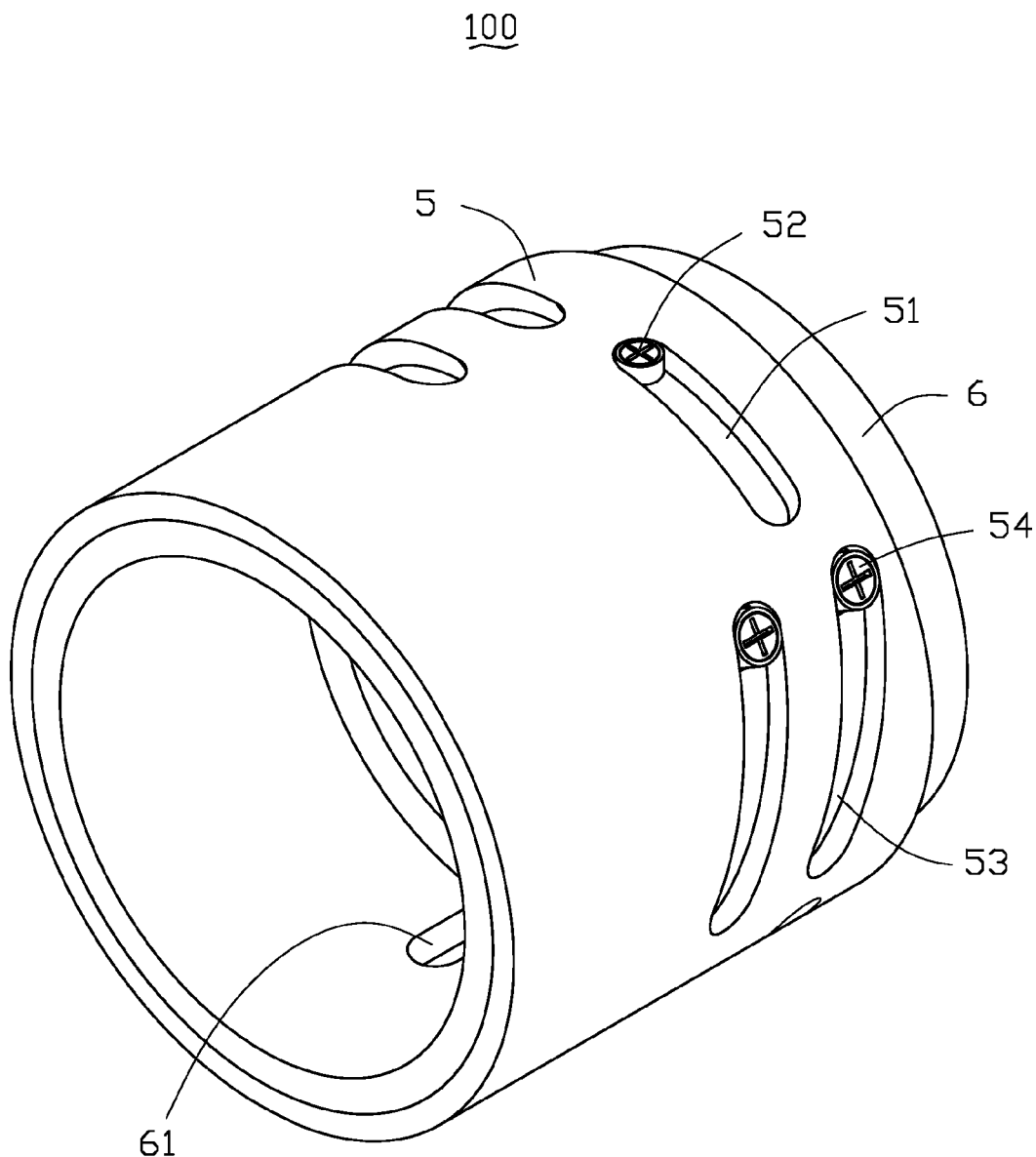
FIG. 3 is schematic view of a lens barrel according to a related art.

Referring to FIG. 2, the lens barrel 200 is shown assembled. In the assembled lens barrel 200, the lens groups 3 can only be moved along the direction of the optical axis OO' without rotating about the optical axis OO' and the rotatable barrel 1 is immovable in the direction of the optical axis OO' and is rotatable about the optical axis OO' of the lens barrel 200. By rotating the rotatable barrel 1, the lens groups 3 can be driven by the cam followers 4, and accordingly the focal length of the lens system consisted of the lens groups 3 is adjustable.

In the present embodiment, the arcuate projections 22 are formed on the outer surface of the fixed barrel 2 and both the latching groove 12 and the insertion cutouts 13 are formed in the rotatable barrel 1. It is understood that the arcuate projections 22 can also extend from the inner surface of rotatable barrel 1 while the latching groove 12 and the insertion cutouts 13 being formed on the fixed barrel 2.

In the present embodiment, both the fixed barrel 2 and the rotatable barrel 1 can be formed by injection molding or press-molding and so on. The number of components of the lens barrel 200 is reduced, accordingly, making the lens barrel 200 easier and faster to assemble.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A lens barrel comprising:
    a lens group having an optical axis associated therewith;
    a fixed barrel with the lens group received therein, the fixed barrel having a plurality of projections extending radially from the outer surface of the fixed barrel;
    a rotatable barrel receiving the fixed barrel therein, the rotatable barrel being rotatable relative to the fixed barrel about the optical axis, the rotatable barrel having an inner latching groove defined in the inner surface thereof and a plurality of insertion cutouts defined in a distal edge of the rotatable barrel with the inner latching groove and communicating with the latching groove, the projections insertable in the insertion cutouts and engaging in the latching groove for preventing the rotatable barrel to move axially relative to the fixed barrel.

2. The lens barrel as claimed in claim 1, wherein the fixed barrel has a plurality of linear guide slots formed in a side wall thereof for guiding the lens group to move in an optical axis direction of the lens barrel.

3. The lens barrel as claimed in claim 2, wherein the fixed barrel has three linear guide slots formed in the fixed barrel at 120° intervals.

4. The lens barrel as claimed in claim 1, wherein the rotatable barrel has a plurality of cam grooves and the lens barrel further comprising a plurality of cam followers secured to the lens group for engaging with the cam grooves.

5. The lens barrel as claimed in claim 4, wherein each lens group has three cam followers secured thereon at 120° intervals.

6. The lens barrel as claimed in claim 1, wherein the projections are arcuate projections.

7. The lens barrel as claimed in claim 1, wherein the projections are integrally formed with the fixed barrel.

8. The lens barrel as claimed in claim 7, wherein the three projections are formed on the fixed barrel by injection molding or press-molding.

9. A lens barrel comprising:
    a lens group having an optical axis associated therewith;
    a rotatable barrel rotatable about the optical axis having a plurality of projections extending radially from the inner surface of the rotatable barrel;
    a fixed barrel with the lens group received therein, the fixed barrel having a outer latching groove defined in the outer surface thereof and a plurality of insertion cutouts defined in a distal edge of rotatable barrel with the outer latching groove and communicating with the latching groove, the projections insertable in the insertion cutouts and engaging in the latching groove for preventing the rotatable barrel to move axially relative to the fixed barrel.

10. The lens barrel as claimed in claim 9, wherein the fixed barrel has a plurality of linear guide slots formed in a side wall thereof for guiding the lens group to move in an optical axis direction of the lens barrel.

11. The lens barrel as claimed in claim 10, wherein the fixed barrel has three linear guide slots formed on the fixed barrel at 120° intervals.

12. The lens barrel as claimed in claim 9, wherein the rotatable barrel has a plurality of cam grooves and the lens barrel further comprising a plurality of cam followers secured to the lens group for engaging with the cam grooves.

13. The lens barrel as claimed in claim 12, wherein each lens group has three cam followers secured thereon at 120° intervals.

14. The lens barrel as claimed in claim 9, wherein the projections are arcuate projections.

15. The lens barrel as claimed in claim 9, wherein the projections are integrally formed with the rotatable barrel.

16. The lens barrel as claimed in claim 15, wherein the three projections are formed on the rotatable barrel by injection molding or press-molding.

* * * * *